United States Patent [19]

Kobayashi et al.

[11] Patent Number: 5,223,887
[45] Date of Patent: Jun. 29, 1993

[54] AUTOFOCUS CAMERA

[75] Inventors: Takeo Kobayashi, Tokyo; Yasushi Tabata, Chiba; Norio Numako, Tochigi; Katsutoshi Nagai, Saitama, all of Japan

[73] Assignee: Asahi Kogaku Kogyo Kabushiki Kaisha, Tokyo, Japan

[21] Appl. No.: 812,834

[22] Filed: Dec. 20, 1991

Related U.S. Application Data

[63] Continuation of Ser. No. 671,998, Mar. 18, 1991, abandoned, which is a continuation of Ser. No. 598,764, Oct. 15, 1990, abandoned, which is a continuation of Ser. No. 527,640, May 24, 1990, abandoned, which is a continuation of Ser. No. 374,074, Jun. 30, 1989, abandoned.

[30] Foreign Application Priority Data

Jun. 30, 1988 [JP] Japan ................................ 63-87122

[51] Int. Cl.⁵ ...................... G03B 13/36; G03B 17/18; G08C 19/16
[52] U.S. Cl. .................................. 354/409; 354/412; 354/471; 340/870.24; 340/870.28
[58] Field of Search ............... 354/409, 412, 484, 471, 354/473, 474, 475; 340/870.24, 870.28

[56] References Cited

U.S. PATENT DOCUMENTS

| | | | |
|---|---|---|---|
| 4,077,030 | 2/1976 | Helava | 340/870.24 X |
| 4,397,533 | 8/1983 | Naruse et al. | 354/289.12 |
| 4,411,508 | 10/1983 | Kazumi | 354/198 |
| 4,423,934 | 1/1984 | Lambeth et al. | 354/412 |
| 4,471,354 | 9/1984 | Smith | 340/870.24 |
| 4,542,972 | 9/1985 | Nakajima | 354/409 |
| 4,553,140 | 11/1985 | Maida | 354/473 X |
| 4,597,659 | 7/1986 | Suda et al. | 354/409 |
| 4,649,386 | 3/1987 | McGregor et al. | 340/870.24 |
| 4,692,005 | 9/1987 | Takami | 354/21 |
| 4,711,547 | 12/1987 | Iizuka | 354/471 |
| 4,716,429 | 12/1987 | Misawa | 354/409 |
| 4,887,105 | 12/1989 | Ishikawa et al. | 354/21 |

FOREIGN PATENT DOCUMENTS

60-225122 11/1985 Japan .

*Primary Examiner*—W. B. Perkey
*Attorney, Agent, or Firm*—Sandler, Greenblum & Bernstein

[57] ABSTRACT

An apparatus for monitoring the operation of a measuring unit for obtaining information related to a predetermined parameter. The measuring unit provides an indication of said information having been measured, which can take the form of an indicator lamp, for example. The measuring unit includes a mechanism for inhibiting operation of the indicator for a predetermined time interval, after the elapse of a time period which is related to the information obtained by said measuring unit. The monitoring apparatus measures the length of time of the time period and provides an indication of the time period measured, preferably in terms of the monitored parameter. The disclosed invention is particularly suited to the monitoring of an distance measuring unit or a photometric unit for an automatic camera so that proper operation of such units can be confirmed without having to disassembly the camera.

30 Claims, 12 Drawing Sheets

AUTOFOCUS CAMERA

This application is a continuation of application Ser. No. 07/671,998, filed Mar. 18, 1991, now abandoned; which is a continuation of application Ser. No. 07/598,764, filed Oct. 15, 1990, now abandoned; which is a continuation of application Ser. No. 07/527,640, filed May 24, 1990, now abandoned, which is a continuation of application Ser. No. 07/374,074, filed Jun. 30, 1989, now abandoned.

BACKGROUND OF THE INVENTION

1. Field of the Invention

The present invention relates to an autofocus camera equipped with a distance measuring unit for measuring the distance from a subject, and an indicator unit adapted to light or blink to indicate that the distance measurement has been completed.

2. Description of Background and Relevant Information

Cameras with built-in distance and light measuring units have been widely used in the category of still cameras, especially in lens shutter cameras.

The autofocus camera of this type measures the distance from the subject with the distance measuring unit, brings its photographing lens into focus by moving the focus lens according to the distance measured, and determines the shutter speed in dependence on the brightness of the subject measured with the photometric unit.

The autofocus camera as mentioned above has been associated with the problem that, in order to check for normal operation of the distance and light measuring units, the camera has to be disassembled to expose electric signal terminals of the distance and light measuring units, to which measuring instruments are then connected to monitor the signals sent from such distance and light measuring units.

SUMMARY OF THE INVENTION

The present invention has been made in view of the problems discussed above with known cameras, and has an object to provide an autofocus camera whose distance and light measuring units can be inspected without disassembling the camera.

In order to achieve the foregoing object, the present invention provides, in an autofocus camera equipped with a distance measuring unit for measuring the distance from a subject to be photographed, and an indicator unit for indicating that distance measurement has been completed, a blinking control means for quickly blinking the indicator unit in accordance with distance measurement data given by the distance measuring unit upon actuating the indicator unit.

In another form of the invention, the autofocus camera is provided with a distance measuring unit for measuring the distance from a subject to be photographed, a photometric unit for measuring the brightness of the subject, an indicator unit for indicating that distance measurement has been done. The invention includes a blinking control means for quickly blinking the indicator unit in accordance with photometric data given by the photometric unit upon actuating the indicator unit.

In one aspect of the invention, an apparatus is provided for monitoring the operation of a measuring unit for obtaining information related to a predetermined parameter. The measuring unit provides an indication of the information having been measured, which can take the form of an indicator lamp, for example. The measuring unit includes a mechanism for inhibiting operation of the indicator for a predetermined time interval, after the elapse of a time period which is related to the information obtained by said measuring unit. The monitoring apparatus measures the length of the time period and provides an indication of the time period measured, preferably in terms of the monitored parameter for confirmation thereof. The disclosed invention is particularly suited to the monitoring of a distance measuring unit or a photometric unit for an automatic camera so that proper operation of such units can be confirmed without having to disassemble the camera.

According to one object of the invention, the lighting of the indicator lamp is interrupted for a predetermined segment of time, which defines the end of the predetermined time interval. The segment of time during which lighting of the indicator lamp is interrupted is substantially humanly imperceptible and is approximately 250 microseconds.

The distance-measuring unit of the camera includes means for indicating whether a subject to be photographed is at a proper distance for focusing. If it is determined that a subject to be photographed is too close for proper focusing, the indicator lamp is blinked, or intermittently lighted, at a humanly perceptible rate, preferably about 4 Hz. If it is determined that the subject is within a proper focusing distance range, the indicator lamp is continuously lighted. According to the present invention, the monitoring unit measures the predetermined time interval prior to the blinking or continuous light signals.

Further according to the invention, to ensure that operation of the "too-short" distance warning, by which the indicator lamp is blinked, is not impeded, operation of said monitoring apparatus is delayed for a predetermined time prior to measuring the length of the time interval, preferably about 300 milliseconds.

Still further according to the invention, operation of the monitoring unit is accomplished by producing a digital signal having a value indicative of the distance between the camera and a subject to be photographed, and the indicator lamp is lighted for the predetermined time interval as a function of the value of the digital signal.

According to the preferred embodiment of the present invention, the length of the above-mentioned time interval is measured by means of a photocell for receiving light emitted by the indicator lamp.

Further according to the present invention, an indicator is provided for the monitoring apparatus which gives an indication of the distance-related information measured by the object-distance-measuring unit which is indicated by the indicator lamp.

Still further according to the present invention, the camera includes an operation button, array including a button for operation of a photometric switch, wherein the means for lighting the indicator lamp is responsive to actuation of the photometric switch. This button preferably comprises a two-stage switch which further includes a shutter release switch, wherein a first actuation of the button actuates the photometric switch, as an indication that a picture is about to be taken, thereby initiating an autofocus/autoexposure series of operations, and wherein a second actuation of the button actuates the shutter release switch, thereby releasing the shutter and exposing a film frame.

BRIEF DESCRIPTION OF THE DRAWINGS

Other aspects of the present invention will become evident and the invention is further explained in the following detailed description in connection with the accompanying drawings, which are given by way of a non-limiting preferred embodiment, in which.

DETAILED DESCRIPTION OF PREFERRED EMBODIMENT

Figure 1:
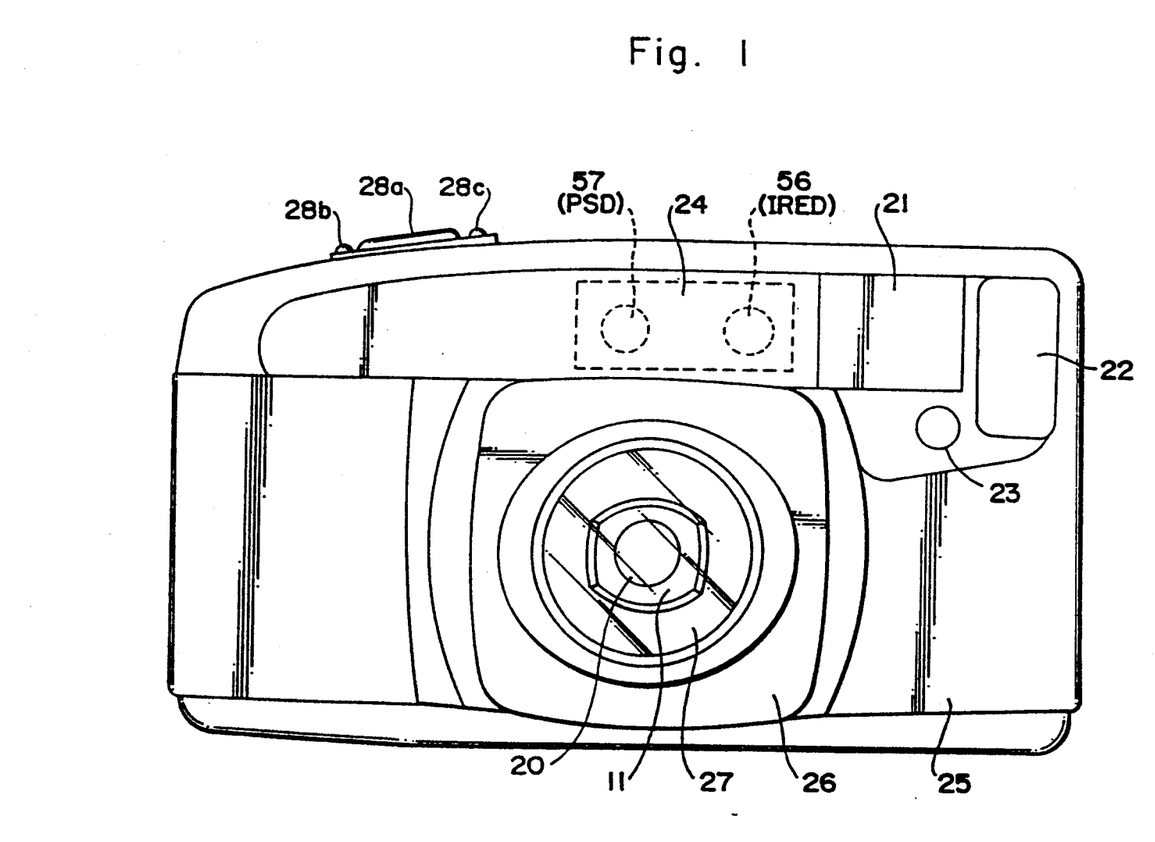
FIG. 1 is a front view of a lens shutter camera according to the present invention.
Figure 2:
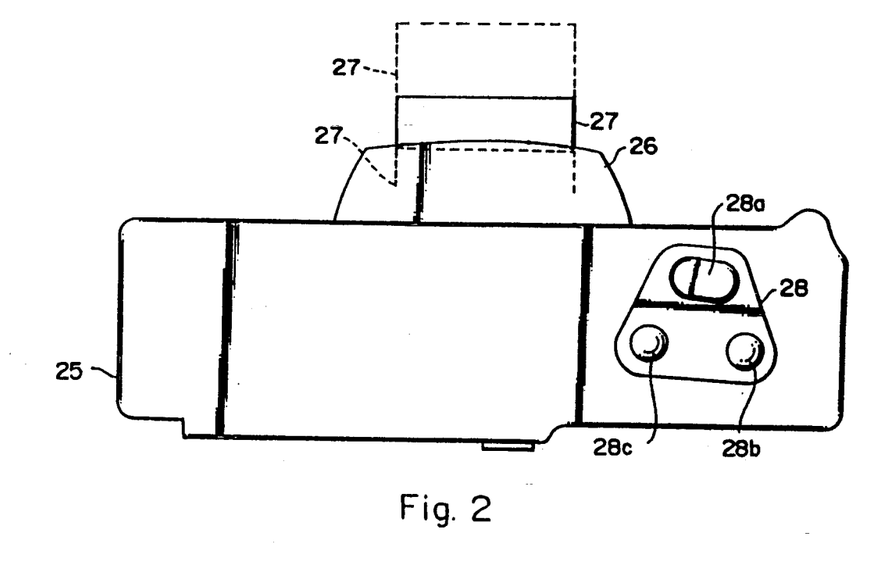
FIG. 2 a plan view of the camera.
Figure 3:
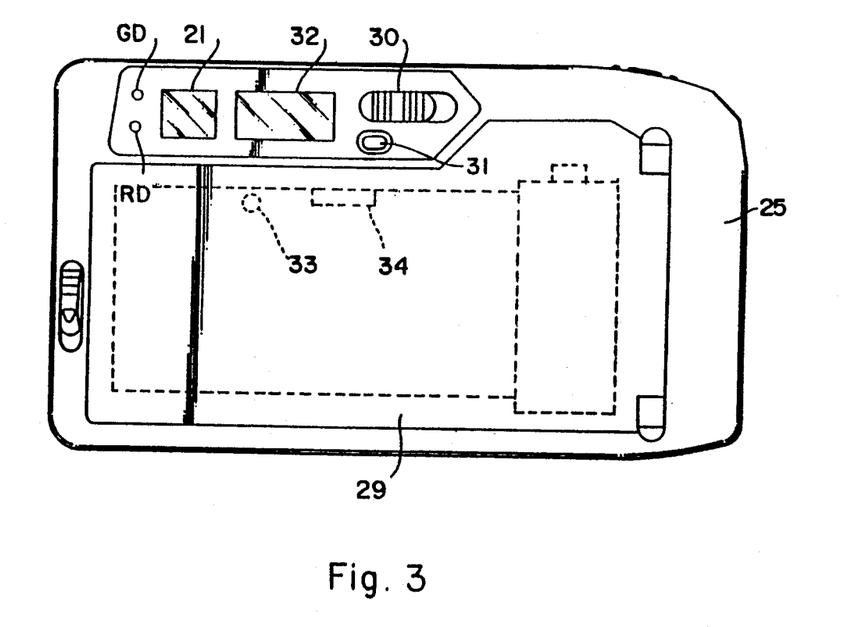
FIG. 3 a rear view of the camera.

FIGS. 1 to 3 illustrate a compact lens shutter auto strobe camera housed in a body 25 and in which photographic lens system 20 and finder system 21 are installed independently. FIG. 1 shows the front view of the lens shutter camera, FIG. 2 shows the top view, and FIG. 3 shows the rear view. Strobe 22 for illuminating the subject, photocell 23 for measuring the brightness of the subject, infrared emitting diode (IRED) 56 for emitting infrared rays at the subject, and position sensor (PSD) 57 for outputting a position signal according to the distance from the subject by receiving infrared light reflected from the subject, are installed on the front of camera body 25.

A fixed lens barrel 26 is installed on camera body 25. A movable lens barrel 27 for supporting the photographic lens system 20 is installed in fixed lens barrel 26 and is projected therefrom when required. Movable lens barrel 27 changes its position between the storage position, shown by a dot-dash line, and the extended position shown by a broken line, both shown in FIG. 2. With this structure, the focal length of the photographic lens system 20 can be changed between 38 mm and 60 mm. When movable lens barrel 27 is stored in the position shown by the dot-dash line, the photographic lens system 20 is covered with a lens cover, which is not shown in the drawing.

On top of camera body 25, a substantially triangularly shaped operation button array 28, which is also used for zoom control, is installed. At the front of the array 28 is a button 28a which constitutes a two-stage switch incorporating a photometric switch and a shutter release switch, the operation of which is described below and is illustrated in the flowcharts in the drawings. At one side of the rear of the operation button array 28 is a button 28b which actuates a zoom tele switch. At the other side of the rear of array 28 is a button 28c which constitutes a zoom wide switch. These three buttons, 28a, 28b and 28c, can be operated independently. Further, when one of them is operated, the other two cannot be operated.

On the back of body 25, above the rear cover 29, the following are provided: main switch 30; mode switch 31, to switch over to the daylight synchro mode; liquid crystal display panel 32 (hereinafter referred as the LCD panel), which displays the number of photographs taken (i.e., the number of exposed film frames which have been advanced in the camera), the focal length of the photographic lens system 20, and other information; a light emitting diode RD which emits red light (hereinafter referred to as the red indicator lamp) and light emitting diode GD which emits green light (hereinafter referred to as the green indicator lamp) are installed. Further, interior of the rear cover 29, the following two switches are provided and are shown by the broken line in FIG. 3: film presence switch 33, which determines whether film is present in the film compartment, and film advancement switch 34, which generates winding pulses according to the movement of the film as it is advanced. Main switch 30 is a slide switch which has three positions; a LOCK position, an ON position, and a MACRO position.

Red indicator lamp RD will blink if the strobe is not ready to flash, when the photometric switch is ON. The red indicator lamp RD is turned on to a continuous light state when the strobe 22 is prepared to emit light when the button 28a is pressed. Green indicator lamp GD blinks if the subject is too close when the photometric switch is ON, and it emits a continuous light when the subject is within the proper distance for taking photographs.

Figure 4:
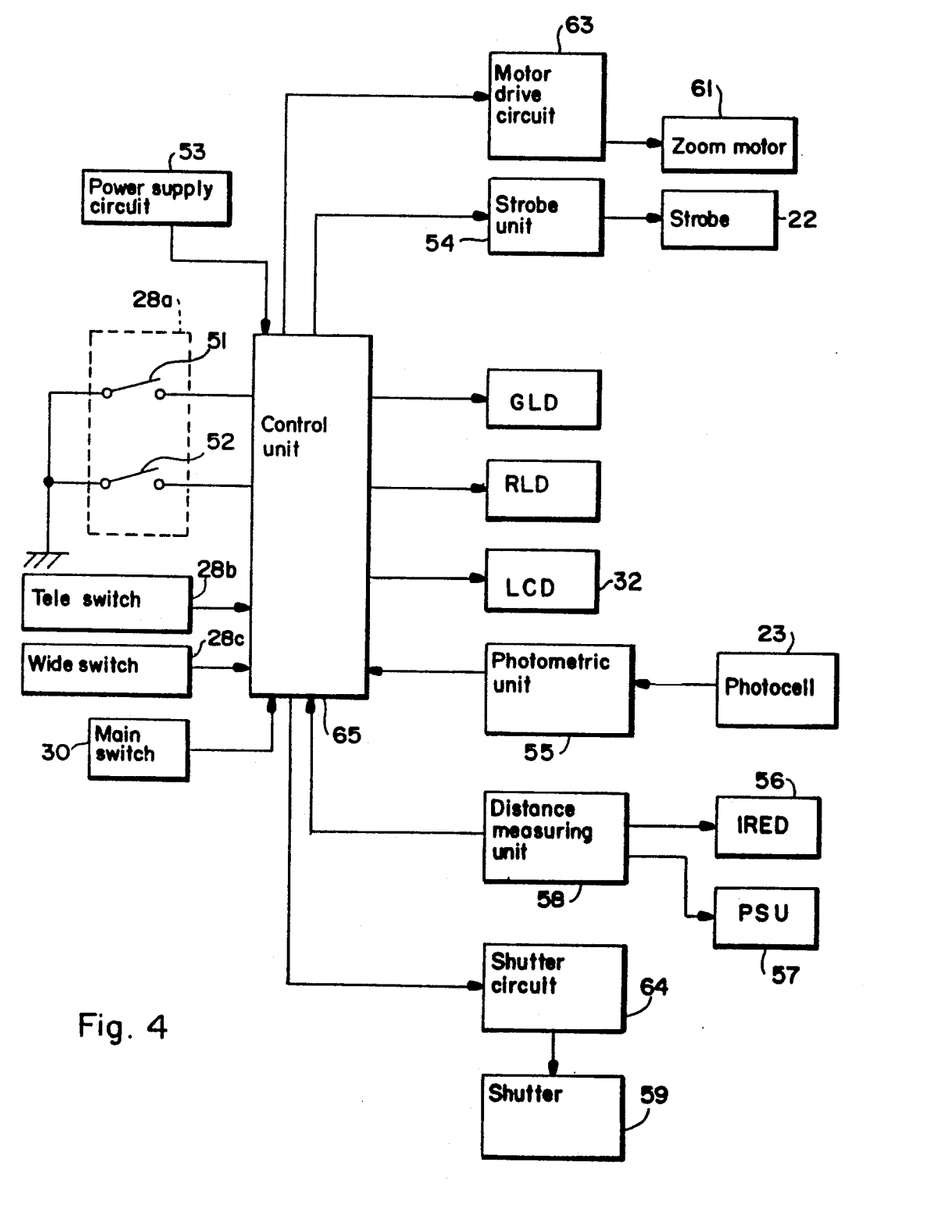
FIG. 4 is a block diagram showing major parts of the control system of the camera.

FIG. 4 is a block diagram showing the main parts of the control system of the above mentioned lens shutter camera. In FIG. 4, the photometric switch 51 and the shutter release switch 52 are shown, which are activated by pressing shutter button 28a. The power supply circuit 53 includes a battery (not shown in the diagram), and the strobe unit 54 causes the strobe 22 to flash, which has a voltage booster circuit and a capacitor which is charged by the voltage booster circuit. Current charging this capacitor is sent to strobe 22 so that it flashes.

A photometric unit 55 measures the brightness of the subject from the signals generated by photocell 23, according to the light it receives. The distance measurement unit 58 calculates the distance to the subject according to position signals which are generated by the infrared emitting diode (IRED) 56 and the position sensor (PSD) 57 after receiving reflected light from the subject. As can be seen, 59 is the shutter block which is operated by shutter circuit 64. Shutter block 59 creates an image of the subject on the film by moving the focus lens (not illustrated) using the built-in pulse motor. This shutter block is already known, for instance, from Japanese Patent Provisional Publication SHO 65-225122.

Zoom motor 61 moves movable lens barrel 27 backwards and forwards. The motor drive circuit 63 which operates zoom motor 61 when either tele switch 28b or wide switch 28c is ON.

Control unit 65 controls the shutter block described above, strobe flashing, the liquid crystal display LCD, and the blinking and lighting of red indicator lamp RD and green indicator lamp GD, according to data from the distance measurement unit 58, photometric unit 55, and switches 28b, 28c, 30, 51 and 52.

Next, the operation of the camera will be explained with reference to the flowcharts illustrated in FIGS. 5 to 8.

Figure 5:
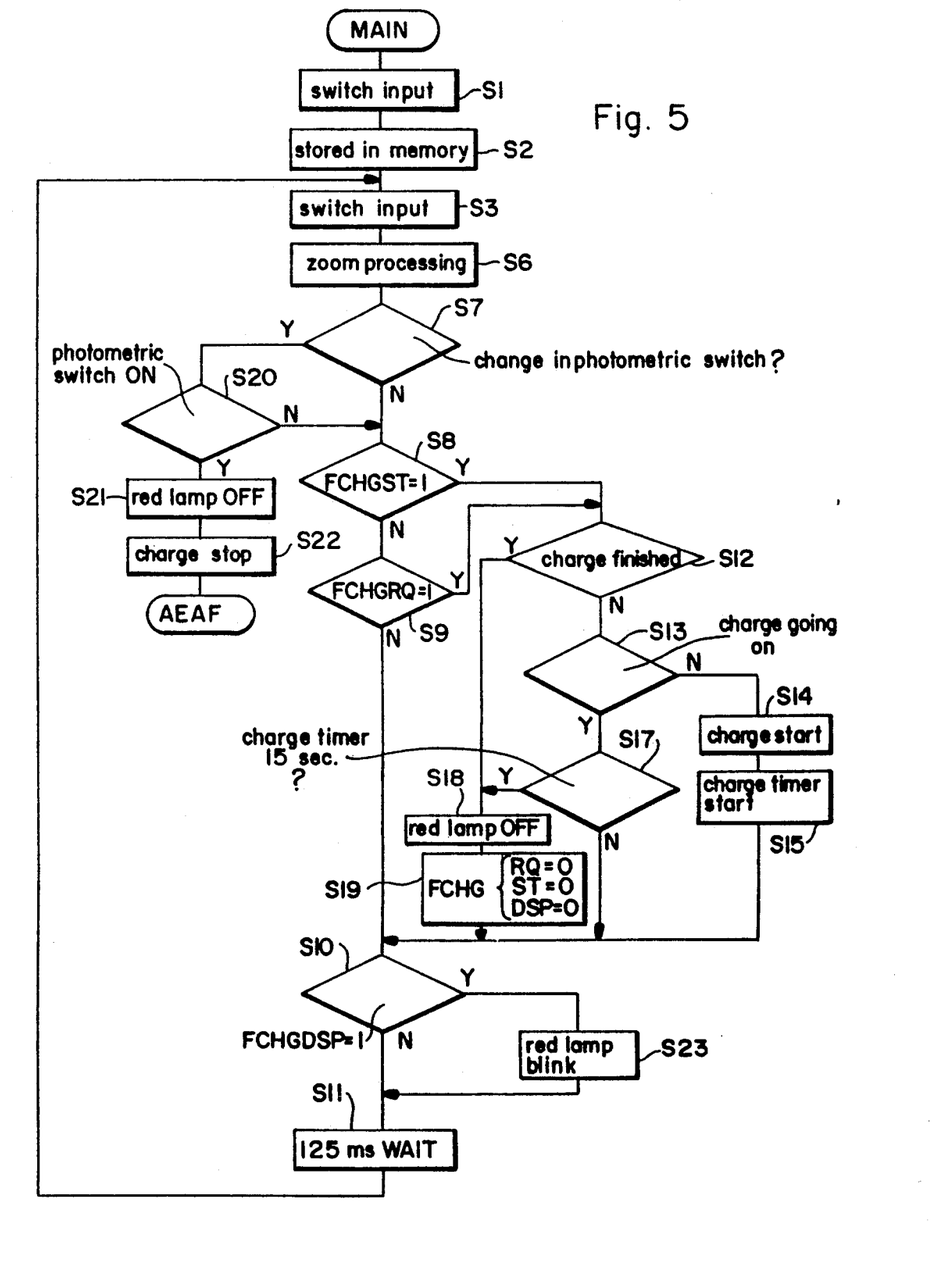
FIGS. 5 through 7 are flowcharts showing the operation of the control system of the lens shutter camera.

First, when main switch 30 is moved to the ON position or the MACRO position from the LOCK position, processing is transferred to the MAIN flow in FIG. 5 from the lock flow which is not illustrated. At this time, charging flag FCHG ST will be set to 1 and both charging flag FCHG RQ and charging flag FCHG DSP will be set to 0. At MAIN flow step 1 (hereinafter referred to as step S1), the input conditions of switches 28b, 28c, 51, 52 and the main switch 30 will be read and all conditions will be stored in memory at step S2. At step S3, the input conditions of switches 28b, 28c, 51, 52 and the main switch 30 will be read again. At step S6, processing branches to the zoom flow (not illustrated in detail) for zoom processing if the position of main switch 30 and the position of the zoom lens (or movable lens barrel 27) are different, or if tele switch 28b or wide switch is ON.

Because the main switch has just been switched ON, processing is transferred to the zoom flow to move movable lens barrel 27 to the position of the continuous line in FIG. 2, from the position of the dot-dash line. After the zoom processing has been carried out in the zoom flow, processing is transferred back to the MAIN flow and the step S6 processing is carried out again. This time, when the positions of the main switch and the zoom lens (or movable lens barrel 27) match, processing goes to step S7.

At step S7, the input condition of photometric switch 51, stored in memory, and the input condition of photometric switch 51, read at step S3, are compared. When no change is detected in the input conditions, processing transfers to step S8. At step S8, whether FCHG ST is equal to 1 is checked. It should be noted that when processing is transferred to the MAIN flow, the value 1 is set in FCHG ST. Therefore, processing goes from step S8 to step S12 to check if the capacitor for the strobe has been charged by the battery, and processing is transferred to step S13 to determine whether the strobe is being charged. If the strobe is not being charged, processing goes to step S14 to start charging the strobe, and a charging timer starts (step S14, step S15). At step S10, whether the charging flag FCHG DSP is set to 1 is checked. When it is set to 1, the red indicator lamp blinks at step S23 and processing is transferred to step S11. When processing is transferred to the MAIN flow, as FCHG DSP was set to 0, processing is transferred from step S10 to step S11. At step S11, processing is suspended for 125 ms. Where there are no changes in the input conditions of switches 28b, 28c, 51 and 52, the strobe is charged in the loop step S3 to step S8, step S12, step S13, step S17, step S10, step S11 and step S3.

If the strobe capacitor has been charged for 15 seconds, from step S17 processing proceeds to step S18 to terminate the charging operation. When charging of the strobe is completed, processing goes from step S12 to step S18, charging is stopped and the red indicator lamp RD is switched OFF at step S18 and the processing goes to step S19. At step step S19, FCHC ST, FCHG RQ and FCHG DSP are each set to 0. After completion of the charging operation, the processing from step S3 to step S11 is carried out repeatedly.

At this time, if shutter button 28a is pressed and photometric switch 51 is ON, at step S7 it is determined whether there is a change in the position of the photometric switch and the processing goes from step S7 to step S20. Processing step S20 judges whether photometric switch 51 is ON and, if it is not ON, the processing goes back to step S8. When it is ON, the red indicator lamp is turned OFF at step S21, charging of the strobe is stopped at step S22, and the processing goes to the AEAF flow illustrated in FIG. 6.

Figure 6:
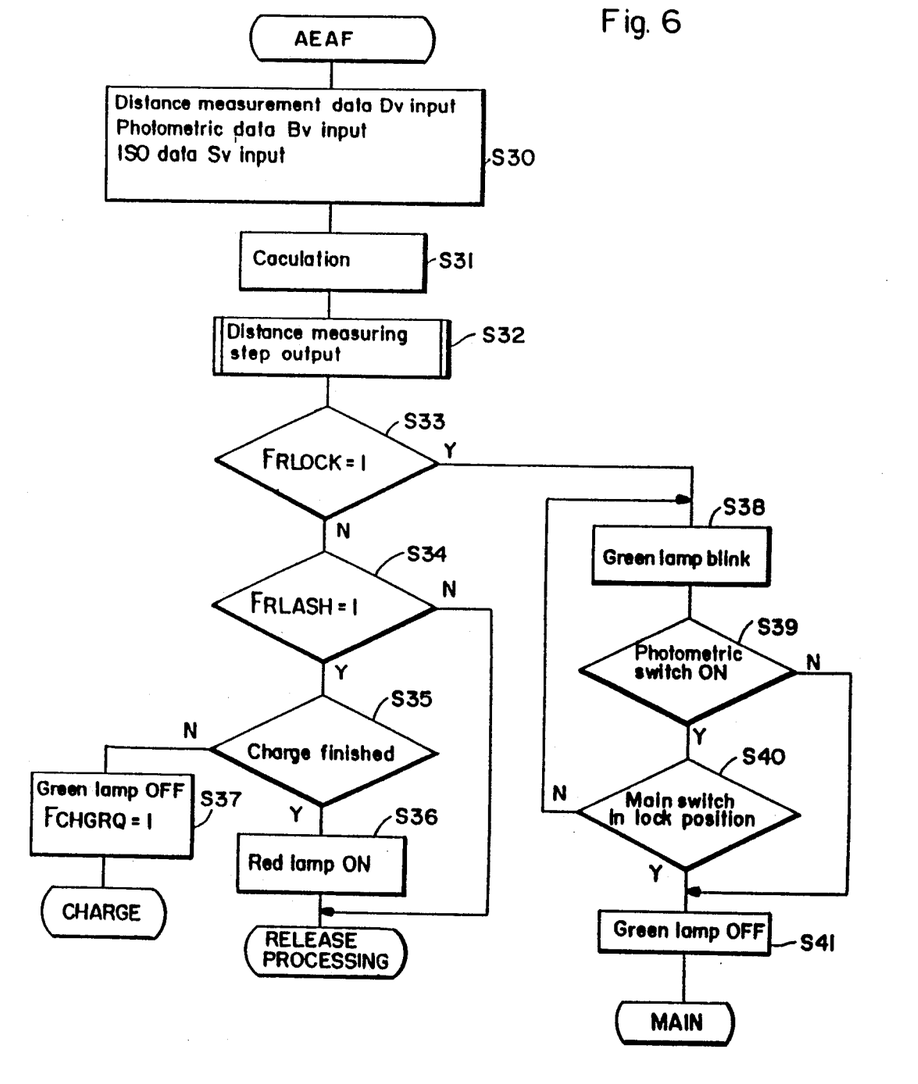
Figure 8:
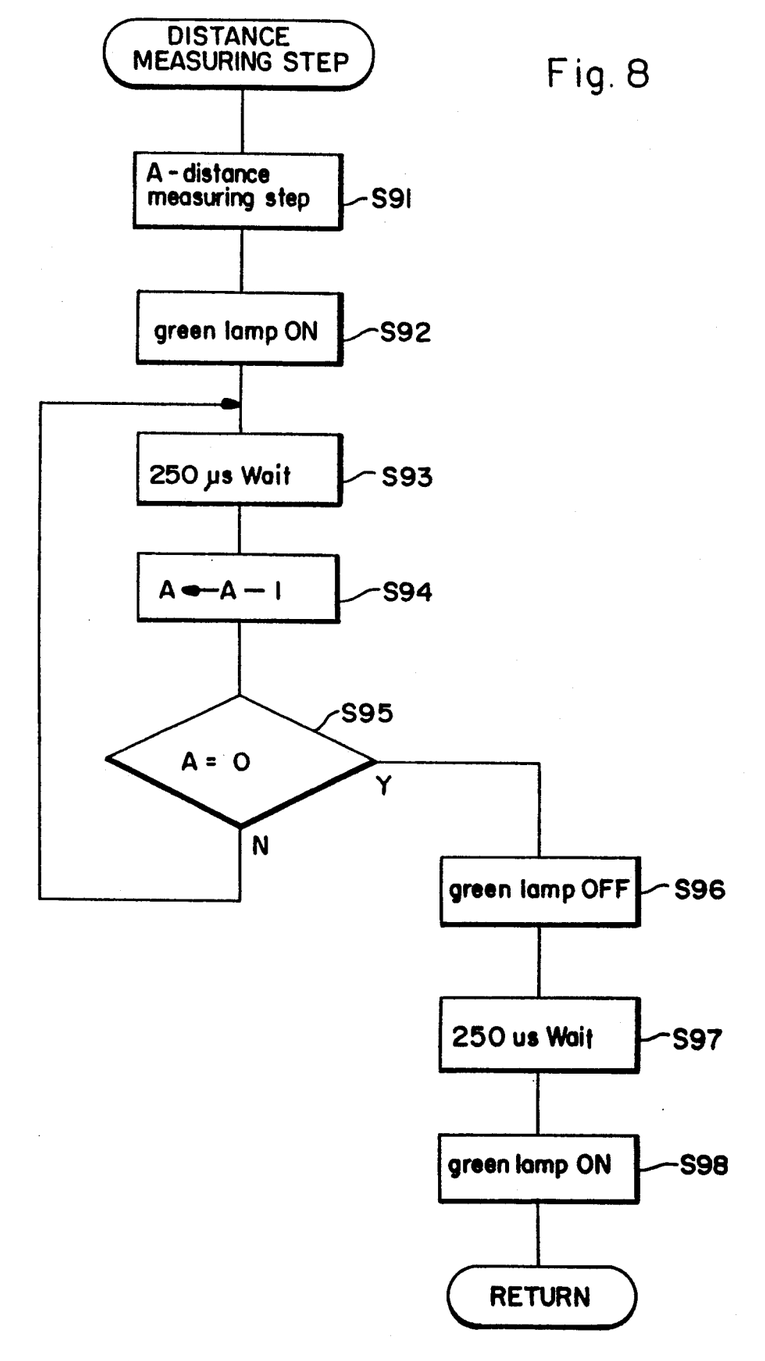
FIG. 8 is a flowchart for the output of distance measuring step values used in connection with the monitoring apparatus of the present invention.
Figure 12:
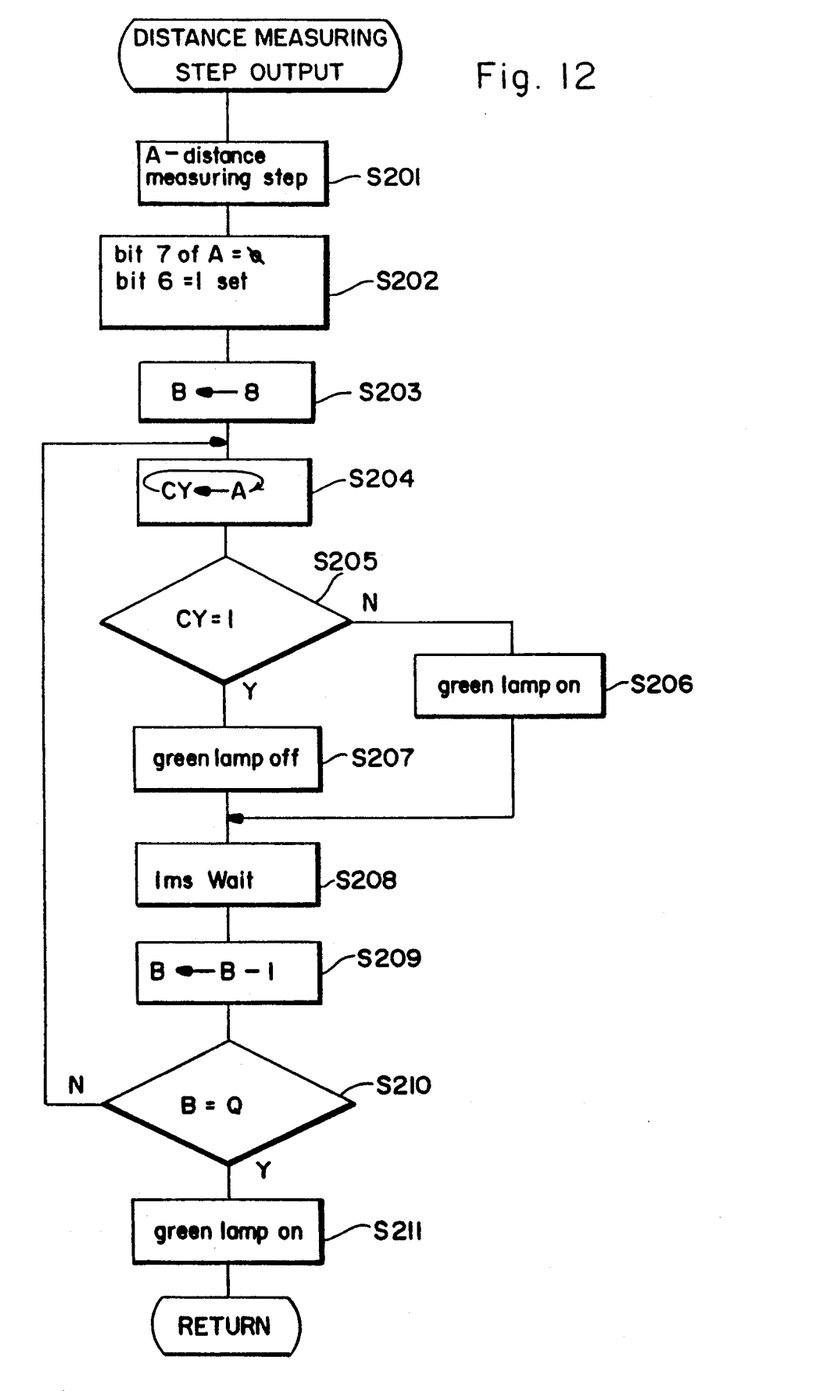
FIGS. 12 and 14 are flowcharts showing other aspects of the invention.

At step S30 in the AEAF flow, distance measurement data Dv, photometric data Bv, and film sensitivity (ISO) data Sv are input. At step S31, exposure value Ev is calculated by adding photometric data Bv and ISO data Sv, and diaphragm value Av, calculated by the flashmatic, is determined from distance measurement data Dv and ISO data Sv. If strobe emission is required, the flag is set to F FLASH=1, and if strobe emission is not required, the flag is set to F FLASH=0. When the subject distance is too close to take a photograph, the flag is set to F RLOCK=1, and when the distance makes it possible to take a photograph, the flag is set to F RLOCK=0. Next, processing proceeds to step S32 at which time distance measurement data is output to light the green indicator lamp. Details are shown in FIG. 8 and FIG. 12 with flowcharts, however a detailed description is also provided below.

At step S33, whether the flag is set to F RLOCK=1 is checked. This is to determine whether the distance makes it possible to take photographs. If it is possible, the processing goes to step S34. At step S34, whether the flag is F FLASH=1 is checked. This is to check if strobe emission is required. When strobe emission is not required, processing proceeds from step S34 to the shutter release processing shown in FIG. 7. If strobe emission is required at step S34, processing proceeds to step S35 to check whether charging is completed, i.e., to determine whether the strobe is ready to flash. When the strobe is ready to flash, from step S34 processing proceeds to shutter release processing after the red indicator lamp is turned ON at step S36. When the red indicator lamp lights, it indicates that the strobe will flash when the shutter is released. When the strobe is not ready to flash, it is judged "NO" at step S35 and processing goes to step S37. At step S37, the red indicator lamp is turned OFF and the flag is set to FCHG RQ=1 and processing goes to the CHARGE flow to charge the strobe capacitor.

When the distance to the subject is judged to be too close to take a photograph at step S33, processing goes to step S38. At step S38, the green indicator lamp blinks and, at step S39, the program checks if photometric switch 51 is ON. When it is ON, the processing goes to step S40 to check if main switch 30 is in the LOCK position. Usually, it is not in the LOCK position, the decision at step S39 is "NO", and processing returns to step S38. When the subject is too close, as long as shutter button 28a is pressed, the release is locked because the processing at step S38, step S39 and step S40 repeatedly loops. At this time, green indicator lamp GD is blinking at approximately 4 Hz to indicate that the subject is too close. If the photometric switch 51 is OFF at step S39 or the main switch 30 is set to the LOCK position at step S40, green indicator lamp GD goes OFF at step S41 and the processing returns to the MAIN flow.

Figure 7:
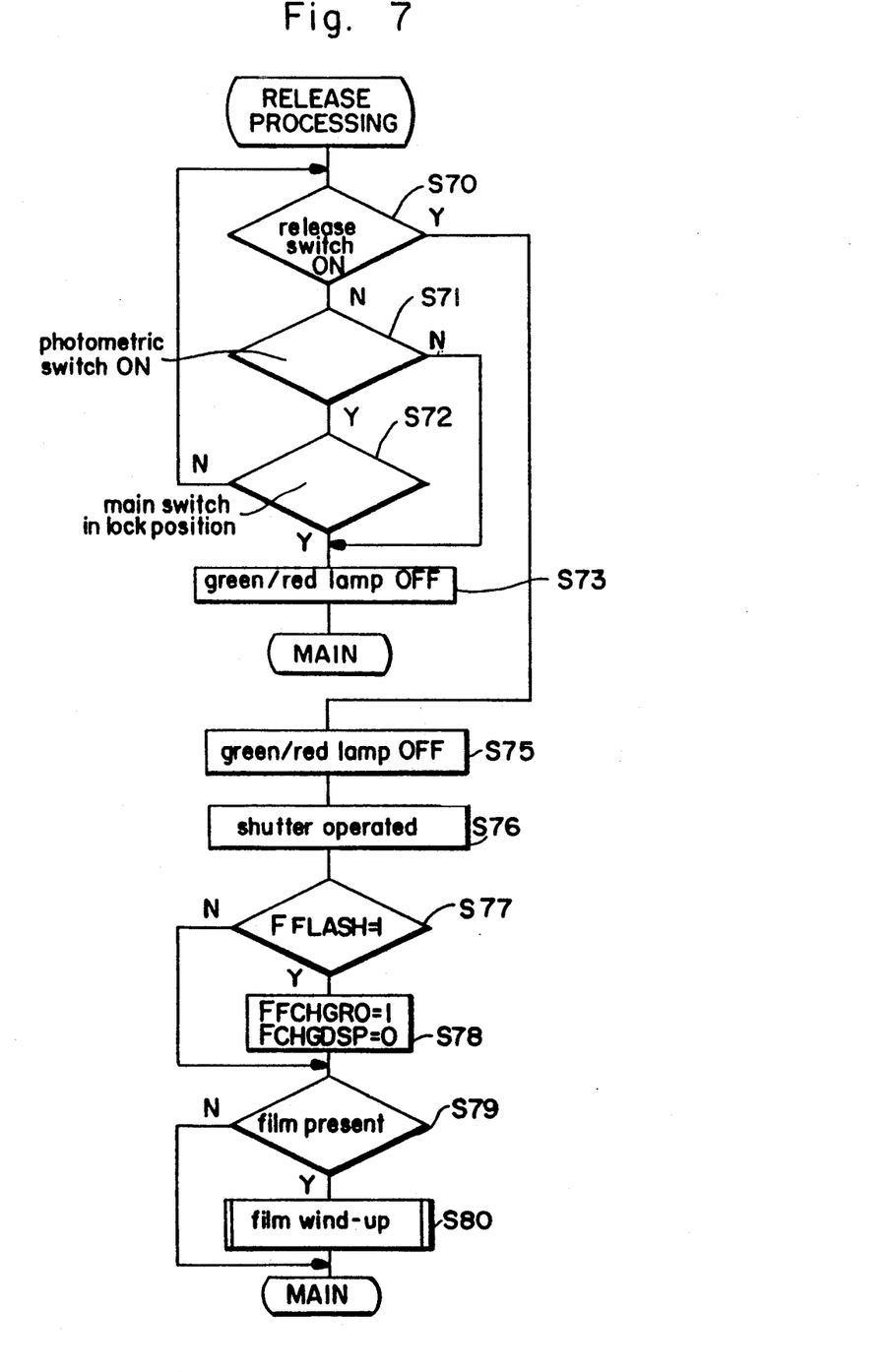

When processing proceeds to the RELEASE PROCESSING flow shown in FIG. 7 from step S34 or S36 in the AEAF flow shown in FIG. 6, step S70 checks if release switch 52 is ON. When it is not ON, processing goes to step S71 to check if photometric switch 51 is ON. If photometric switch 51 is not ON, the green indicator lamp and the red indicator lamp is switched OFF at step S73 and processing returns to the MAIN flow. If photometric switch 51 is ON, processing goes to step S72. At step S72 whether main switch 30 is in the LOCK position is checked. If main switch 30 is not in the LOCK position, processing returns to step S70.

Therefore, if main switch 30 is not in the LOCK position and photometric switch 51 is ON, processing goes around the loop between step S70 and step S72 to wait for release switch 52 to be switched to ON.

At this time, the photographer is informed that the distance to the subject is reasonable by a continuous lighting of the green lamp GD. When the release switch 52 is switched to ON, processing goes to step S75 from step S70. The red indicator lamp RD and the green indicator lamp GD go OFF at step S75 and the shutter unit is operated at step S76 to release the shutter.

Whether strobe 22 is ready to flash is checked at step S77. When strobe 22 is ready to flash, the processing goes to step S78 to set FCHG RQ to 1 and FCHG DSP to 0 to request strobe charging for the next photograph. Since this strobe charging is not requested so that the photographer can take a photograph, FCHG DSP is set to 0 and the red indicator lamp does not light at this point in the processing. Then, the processing goes to step S79. When strobe 22 does not flash, the processing goes to step S79 automatically.

Whether film is loaded is checked at step S79. When film is loaded, the processing goes to step S80. At step S80, film winding is carried out and the processing returns to the MAIN flow. When film is not loaded, the processing returns to the MAIN flow directly from step S79.

The flowchart in FIG. 8 shows the output of the distance measurement data by means of green indicator lamp GD. At step S91, the distance measurement step value according to the distance measured at step S30 in the AEAF flow shown in FIG. 6 is set to counter A. The distance measurement step value corresponds to a distance between the camera and a subject to be photographed and can be represented by a number in the range 1–36, for example. The green indicator lamp GD lights at step S92 and the processing goes to step S94 after being suspended for 250 microseconds (us), or some other short time interval which is not humanly perceptible, at step S93. At step S94, 1 is subtracted from the value of counter A and at step S95, whether the value of counter A is 0 is checked. If it is not 0, the processing returns to step S93.

The processing from step S93 to step S95 is repeated until the value of the counter becomes 0. When the value of the counter becomes 0, processing goes to step S96, the green indicator lamp GD is turned OFF, and the processing goes to step S97. The processing then goes to step S98 after being suspended for 250 us at step S97. At step S98, the green indicator lamp GD lights and the processing returns to the AEAF flow.

Figure 9:
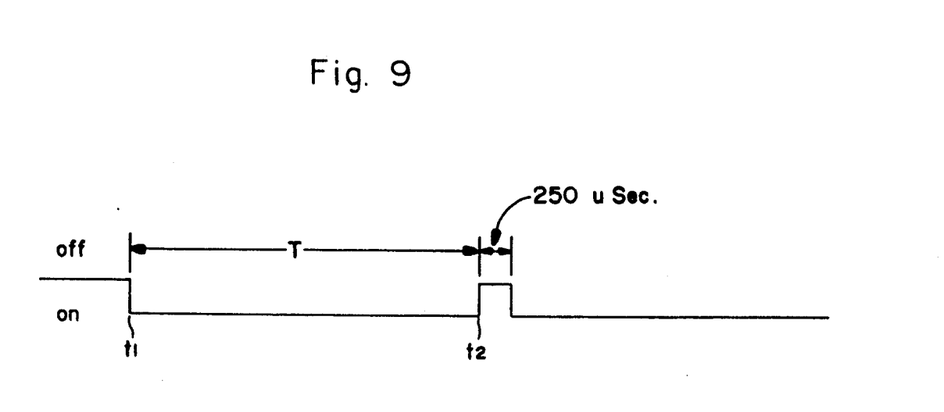
FIG. 9 is an explanatory view showing the lighting state of the green indicator lamp.

In this distance measurement step output in the flowchart, as shown in FIG. 9, the green indicator lamp GD which becomes lit (at step S92), goes off for 250 us (at step S97). For example, if the distance measurement step value as a result of the distance measured by the object-distance-measurement unit of the camera is equal to the number 10, corresponding to a certain camera-to-subject distance, the green indicator lamp goes OFF at $t_1$ for 250 us after the time T=250 us×10 has elapsed from the time lighting starts, at $t_1$. Since the time the light is OFF is only 250 us, the camera operator cannot recognize it. However, it can be detected using a measuring instrument. So, by measuring the time T between $t_1$ when the lighting starts and $t_2$ when the light is switched OFF for 250 us, with a measuring instrument, the distance measurement step according to the distance measurement value measured by distance measurement unit 58 can be monitored.

As mentioned above, the present invention is directed to monitor the operation of both the distance measuring unit as well as the photometric unit. The distance measurement data can be represented, as mentioned above, by step values within the range of 1–36. Likewise, photometric data can be represented, for example, by 39 steps within the range of $2^0/_4$ to $11^2/_4$.

Figure 10:
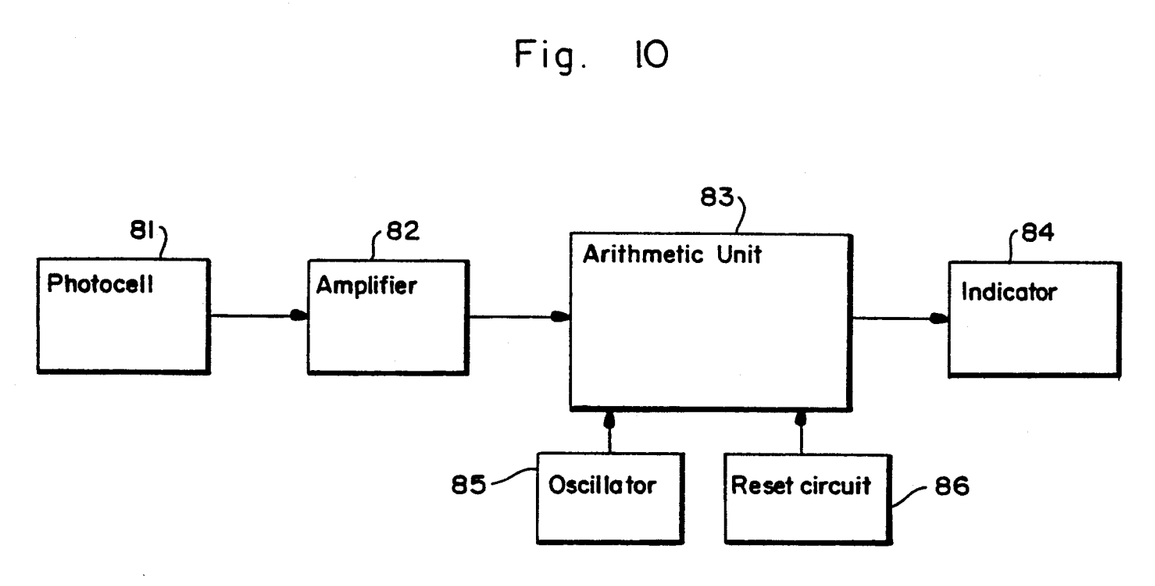
FIG. 10 is a block diagram showing the configuration of a measuring instrument.

FIG. 10 is a block diagram which schematically illustrates the structure of the instrument which measures the above time T. In FIG. 10, a photocell 81 outputs a light-reception signal when it receives light emitted from the green indicator lamp GD of the camera. An amplifier 82 amplifies the above mentioned light-reception signal. An arithmetic unit 83 calculates the above time T from the above light-reception signals and performs the calculations for the distance measurement step from this time T. An indicator 84 indicates the acquired value for the distance measurement step, 85 is an oscillator circuit and 86 is a reset circuit.

Figure 11:
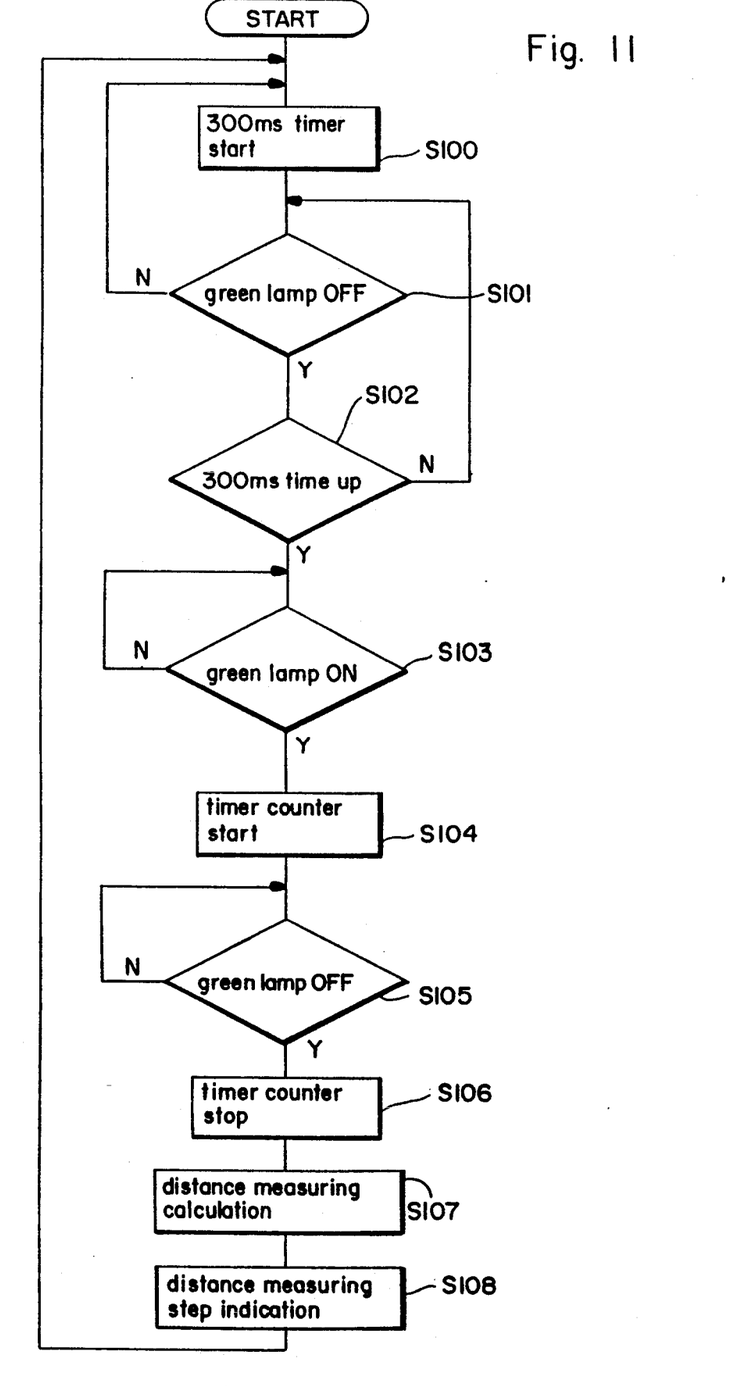
FIG. 11 is a flowchart showing the operation of the measuring instrument.

Next, the operation of the above-described measuring instrument of FIG. 10 will be explained according to the flow diagram shown in FIG. 11.

First, photocell 81 of the measuring instrument is set to receive light emitted by the green indicator lamp GD of the camera. Next, the power source of the measuring instrument, which is not shown in the diagram, is switched ON. Then, a 300 ms (millisecond) timer starts at step S100, and whether the green indicator lamp GD is OFF is checked at step S101. Because the shutter button 28a is not pressed, the green indicator lamp GD is not lit, so the processing goes to step S102. Whether the 300 ms counter has completed counting is checked at step S102. If it has not completed counting, the processing returns to step S101. Because the shutter button 28a is not yet pressed, the green indicator lamp GD goes OFF after 300 ms, and the processing proceeds to step S103.

At step S103, whether the green indicator lamp GD is lit is checked. When it is not lit, the processing returns to step S103 until the two-stage shutter button 28a is pressed, which actuates the photometric switch. When shutter button 28a is pressed to carry out the distance measurement and the green indicator lamp GD lights, the processing goes to step S104. At step S104, the timer counter starts and the processing goes to step S105. At step S105, whether the green indicator lamp GD is OFF is checked. When it has not gone OFF, the processing returns to step S105 until the green indicator lamp GD goes OFF.

When the green indicator lamp GD goes OFF, the processing goes to step S106, the counting of the timer counter is stopped and processing goes to step S107. At step S107, the distance measurement step value is calculated from the value counted by the timer counter. The distance measurement step value is indicated by indicator 84 at step S108 and the processing returns to step S100.

Therefore, when the distance to the subject is specified, whether the distance measurement unit 58 operates correctly is monitored by the distance measurement step value, so that it is not required to disassemble the camera. This capability is particularly useful during the manufacture of cameras, since upon final assembly, no disassembling is required and the testing of the object-distance-measuring unit can be performed in a quick and efficient manner.

When the distance to the subject is too close, as an alarm indicating that the distance is too short, the green indicator lamp GD in FIG. 9 keeps blinking at a frequency of approximately 4 Hz after the green indicator lamp GD goes OFF for 250 us. So, as illustrated in the processing from step S100 to step S102 of FIG. 11, by setting the measuring unit to start measurement after confirming that the green indicator lamp has been turned OFF for 300 ms, mis-operation of the "too short" distance alarm can be avoided.

Figure 13:
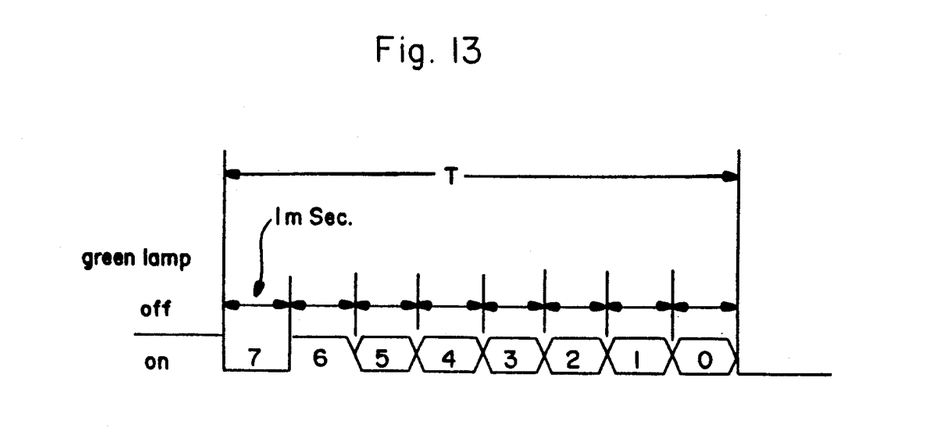
FIG. 13 is an explanatory view of the lighting signal.

FIG. 12 is a flowchart showing examples of other operations. This flowchart shows how distance measurement step values are output as digital signals. Firstly, as shown in FIG. 13, the lighting period T', 8 milliseconds, of the green indicator lamp GD is divided into eight 1 ms intervals, which are numbered from bit 0 to bit 7, and flash the green indicator lamp GD from bit 0 to bit 5 to output the distance measurement step value.

At step S201 in the flow shown in the FIG. 12, the distance measurement step value is transferred to counter A, and bit 7 of counter A is set to 0 and bit 6 is set to 1 at step S202. Because the distance measurement step is the six bits from bit 0 to bit 5, these values will not be changed. At step S203, 8 is set to counter B. Then, at step S204, the data in bit 7 of counter A is read out and the data in counter A is shifted one bit to the left. Whether the read-out data is equal to 1 is checked at step S205. When it is equal to 1, the green indicator lamp GD goes OFF at step S207. When it is not equal to 1, the green indicator lamp GD lights at step S206. The processing is suspended for one millisecond at step S208, and 1 is subtracted from value 8 in counter B at step S209. Whether the value in counter B is 0 is then checked at step S210. When it is not 0, the processing returns to step S204 to read out the data in bit 7 of counter A at step S204 and shift the data in counter A one bit to the left. In this way, the data in counter A is read out one bit at a time, from bit 7 in sequence.

When the value in counter B checked at step S210 is equal to 0, the processing goes to step S211, the green indicator lamp GD lights, then processing returns.

Figure 14:
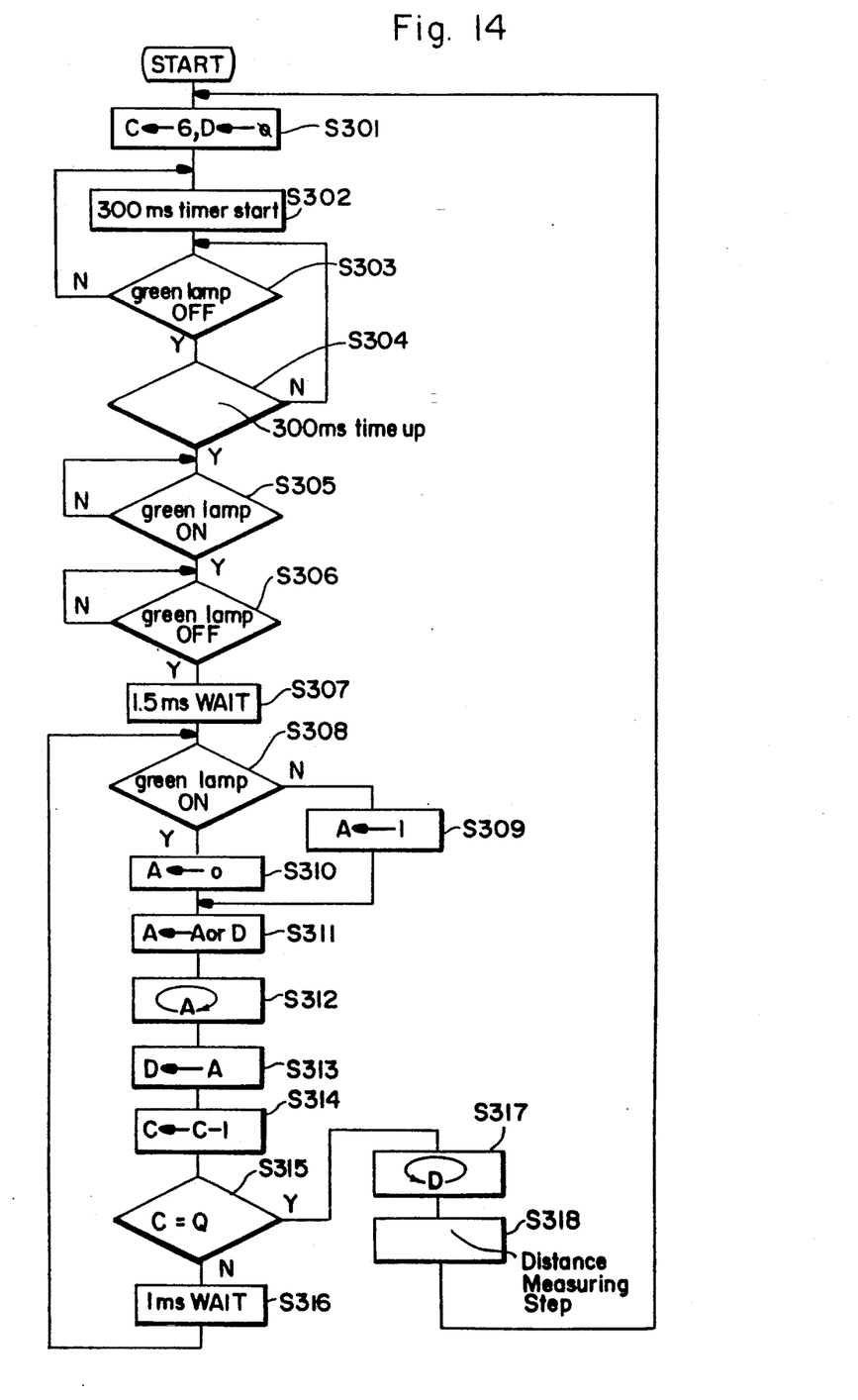

The flowchart shown in FIG. 14 shows how the digital signal output is read in the above flow. 6 is set to counter C and each bit in counter D is set to 0 at step S301. At step S302, the 300 ms timer starts and whether the green indicator lamp GD is lit is checked at step S303 and whether the 300 ms timer has counted up is checked at step S304. Because the processing from step S302 to step S304 are the same as from step S100 to step S102 in FIG. 11, an explanation is omitted at this point.

At step S305, whether bit 7 of the lighting signal shown in FIG. 13 is lit is checked. At step S306, whether bit 6 of the lighting signal is OFF is checked. At step S306, whether bit 6 of the lighting signal is OFF is checked. The processing is suspended for 1.5 ms at step S307 and whether bits 5 to 0 of the lighting signals are lit is checked at step S308. When they are lit, A is set to 0 at step S309. When they are not lit, A is set to 1 at step S309. The data in counters A and D are logically added at step S311 and the result is input to counter A. At step S312, the data in counter A is shifted one bit to the left and the data from counter A is input to counter D at step S313. At step S314, 1 is subtracted from the value in counter C and whether the value in counter C is equal to 0 is checked at step S315. When it is not equal to 0, the processing is suspended for 1 ms at step S316 and processing returns to step S308. In this way, the data from bit 5 to 0 of the lighting signals are read out in the loop step S308 to step S316.

When the value in counter C is judged to be equal to 0 at step S315, the processing goes to step S317. At step S317, the data in counter D is shifted one bit to the right and is recognized as the distance measurement step value which is indicated on the indicator 84 (step S31B). Then processing returns to start.

As has been described above, the present invention makes it possible to monitor output data from distance and light measuring units without disassembling the camera.

While the foregoing description has been made particularly in relation to distance measurement step values, the claimed invention is not limited to this configuration, but can be applied to the arrangement with relation to the output of photometric data. Other changes can be made to the invention as described above in connection with the preferred embodiment without departing from the scope of the present invention which is defined by the following claims.

What is claimed is:

1. A combination of a camera having an electronic control unit that includes an indicator for indicating photography-related information, and an apparatus for monitoring an operation of said electronic control unit, comprising:
   means for lighting said indicator for a predetermined time interval, the length of which is a function of said photograph-related information; and
   means for measuring said length of said time interval.

2. The combination of claim 1, further comprising means for interrupting said lighting of said indicator for a predetermined segment of time, so as to define the end of said predetermined time interval, said predetermined segment of time being substantially imperceptible to a human.

3. The combination of claim 2, wherein said predetermined time interval is approximately 250 microseconds.

4. The combination of claim 1, further comprising means for delaying said operation of said monitoring apparatus for a predetermined time prior to said operation of said means for measuring said length of said time interval.

5. The combination of claim 4, wherein said delaying means comprises means for delaying said operation of said monitoring unit for approximately 300 milliseconds.

6. The combination of claim 1, further comprising means for producing a digital signal having a value that is indicative of said photography-related information, and wherein said means for lighting said indicator lights said indicator for said predetermined time interval as a function of said value of said digital signal.

7. The combination of claim 1, wherein said means for measuring the length of said time interval includes a photocell for receiving light emitted from said indicator.

8. The combination of claim 1, wherein said autofocus camera further comprises an operation button array that includes a button for operating a photometric switch, wherein said means for lighting said indicator means is responsive to an actuation of said photometric switch.

9. The combination of claim 8, wherein said button comprises a two-stage switch which further includes a shutter release switch, wherein a first actuation of said button actuates said photometric switch and a second actuation of said button actuates said shutter release switch.

10. The combination of claim 1, wherein said camera is an autofocus camera.

11. A camera, comprising:
a distance-measuring unit;
an indicator; and
means for lighting said indicator for a substantially humanly imperceptible predetermined interval of time, said substantially humanly imperceptible time interval being determined in response to distance information obtained by said distance-measuring unit.

12. The camera of claim 1, wherein said distance-measuring unit comprises means for determining a distance between said autofocus camera and a subject to be photographed by said autofocus camera.

13. The camera of claim 11, wherein said camera is an autofocus camera.

14. A camera, comprising:
a photometric unit;
an indicator; and
means for lighting said indicator for a predetermined interval of time, said time interval being determined in response to photometry information obtained by said photometric unit.

15. The camera of claim 14, further comprising means for interrupting said lighting of said indicator for a predetermined segment of time, so as to define the end of said predetermined time interval, said predetermined segment of time being substantially imperceptible to a human.

16. The camera of claim 15, wherein said predetermined time interval is approximately 250 microseconds.

17. The camera of claim 14, wherein said camera is an autofocus camera.

18. A camera, comprising:
means for obtaining photography-related information;
an indicator; and
means for lighting said indicator for predetermined interval of time, said time interval being determined in response to photography-related information obtained by said means for obtaining photography-related information, wherein said photography-related information comprises photometry information.

19. An apparatus for monitoring an operation of a distance-measuring unit of a camera having an indicator, said indicator being lit for a predetermined interval of time in response to distance information obtained from said distance-measuring unit, comprising:
means for receiving light produced by said indicator; and
means for measuring said time interval of said light received by said receiving means.

20. The apparatus of claim 19, further including an indicator for indicating information obtained by said means for measuring said length of said time interval, which is indicative of said information indicated by said indicator.

21. An apparatus for monitoring an operation of a photometric unit of a camera having an indicator, said indicator being lit for a predetermined interval of time in response to photometry information obtained from said photometric unit, comprising:
means for receiving light produced by said indicator means; and
means for measuring said time interval of said light received by said receiving means.

22. A camera, comprising:
a distance-measuring unit;
an indicator;
means for lighting said indicator for a predetermined interval of time, said time interval being determined in response to distance information obtained by said distance-measuring unit; and
means for interrupting said lighting of said indicator for a predetermined segment of time, so as to define the end of said predetermined time interval, said predetermined segment of time being substantially imperceptible to a human.

23. A camera, comprising:
a distance-measuring unit;
an indicator; and
means for lighting said indicator for a predetermined interval of time, said time interval being determined in response to distance information obtained by said distance-measuring unit, wherein said predetermined time interval is approximately 250 microseconds.

24. A camera, comprising:
a distance-measuring unit;
an indicator;
means for lighting said indicator for a predetermined interval of time, said time interval being determined in response to distance information obtained by said distance-measuring unit, said distance-measuring unit comprising means for determining a distance between said camera and a subject to be photographed by said camera;
means for indicating whether a subject to be photographed is at a proper distance for focusing; and
means for blinking said indicator at a humanly imperceptible rate when said subject to be photographed is determined to be too close for focusing, and means for continuously lighting said indicator when said subject to be photographed is determined to be at a proper distance for focusing, wherein said means for lighting said indicator for a predetermined time interval is operational prior to an operation of said means for blinking and said means for continuously lighting said indicator.

25. A combination of a measuring unit for obtaining information related to a predetermined parameter, said measuring unit having means for providing an indication of said obtained information, and an apparatus for monitoring the operation of said measuring unit, comprising:
means for inhibiting an operation of said means for providing an indication of said information, for a predetermined time interval, after the elapse of a time period which is related to said information obtained by said measuring unit;
means for measuring the length of said time period; and
means for indicating the length of said time period.

26. A camera, comprising:

means for obtaining photography-related information;

an indicator; and means for lighting said indicator for a substantially humanly imperceptible predetermined interval of time, said substantially humanly imperceptible time interval being determined in response to photography-related information obtained by said means for obtaining photography-related information.

27. The camera of claim 26, wherein said photography-related information comprises distance information.

28. The camera of claim 26, wherein said camera is an autofocus camera.

29. A camera, comprising:

means for obtaining photography-related information;

an indicator;

means for lighting said indicator for a predetermined interval of time, said time interval being determined in response to photography-related information obtained by said means for obtaining photography-related information; and means for interrupting said lighting of said indicator for a predetermined segment of time, so as to define the end of said predetermined time interval, said predetermined segment of time being substantially imperceptible to a human.

30. The camera of claim 29, wherein said predetermined time interval is approximately 250 microseconds.

* * * * *